US012785885B2

(12) United States Patent
Manolakos et al.

(10) Patent No.: US 12,785,885 B2
(45) Date of Patent: *Nov. 3, 2026

(54) RECEIVE-SIGNAL PATH ALLOCATION FOR MULTIPLE POSITIONING FREQUENCY LAYER PROCESSING

(71) Applicant: QUALCOMM Incorporated, San Diego, CA (US)

(72) Inventors: Alexandros Manolakos, Athens (GR); Mukesh Kumar, Hyderabad (IN); Srinivas Yerramalli, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

This patent is subject to a terminal disclaimer.

(21) Appl. No.: 18/627,127

(22) Filed: Apr. 4, 2024

(65) Prior Publication Data

US 2024/0250790 A1 Jul. 25, 2024

Related U.S. Application Data

(63) Continuation of application No. 17/463,677, filed on Sep. 1, 2021, now Pat. No. 11,991,108.

(Continued)

(51) Int. Cl.

| | |
|---|---|
| ***H04W 88/08*** | (2009.01) |
| ***H04L 5/00*** | (2006.01) |
| ***H04W 64/00*** | (2009.01) |

(52) U.S. Cl.

CPC .................................. *H04L 5/0048* (2013.01)

(58) Field of Classification Search

None

See application file for complete search history.

(56) References Cited

U.S. PATENT DOCUMENTS 10,660,109 B2 5/2020 Bitra et al.
11,991,108 B2 * 5/2024 Manolakos ............ H04W 8/22

(Continued)

FOREIGN PATENT DOCUMENTS

CN 113922931 A 1/2022
WO 2018093835 5/2018

OTHER PUBLICATIONS

3GPP TS 37.355: "3rd Generation Partnership Project; Technical Specification Group Radio Access Network; LTE Positioning Protocol (LPP) (Release 16)", 3GPP TS 37.355, 3rd Generation Partnership Project, Mobile Competence Centre, 650, Route Des Lucioles, F-06921 Sophia-Antipolis Cedex, France, No. V16.1.0, Jul. 24, 2020 (Jul. 24, 2020), 292 pages, XP051925824, Chapters 4.1.3, 6.5.1.2, Sections 5-5.3.4 and 6.4.2-6.4.3, p. 13, paragraph 1 Scope—p. 104, paragraph 6.5.1.9 OTDOA Error Elements.

(Continued)

*Primary Examiner* — Maharishi V Khirodhar
(74) *Attorney, Agent, or Firm* — QUALCOMM Incorporated

(57) ABSTRACT

A signal processing method includes: transmitting, to a network entity from a user equipment, a capability indication indicating that the user equipment is capable of processing a plurality of positioning reference signals, of a plurality of different frequencies corresponding to different frequency layers, that at least partially overlap in receipt time at the user equipment; receiving the plurality of positioning reference signals at the user equipment at least partially overlapping in time; and processing the plurality of positioning reference signals at the user equipment in accordance with the capability indication.

20 Claims, 11 Drawing Sheets

Related U.S. Application Data

(60) Provisional application No. 63/078,956, filed on Sep. 16, 2020.

(56) References Cited

U.S. PATENT DOCUMENTS

| | | | |
|---|---|---|---|
| 2016/0345229 | A1 | 11/2016 | Das et al. |
| 2017/0339516 | A1 | 11/2017 | Edge et al. |
| 2019/0281405 | A1 | 9/2019 | Chae |
| 2021/0185632 | A1 | 6/2021 | Manolakos et al. |
| 2022/0085945 | A1 | 3/2022 | Manolakos et al. |

OTHER PUBLICATIONS

Intel Corporation: "Output of email Thread [100e-NR-Pos-DL-PRS-02]", 3GPP Draft, 3GPP TSG RAN WG1 #100E, R1-2001235, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Mar. 5, 2020 (Mar. 5, 2020), XP051860376, 19 Pages, Section 2.4 and Section 3, "Updated Proposal #4".

International Preliminary Report on Patentability—PCT/US2021/048820 The International Bureau of WIPO—Geneva, Switzerland, Mar. 30, 2023.

International Search Report and Written Opinion—PCT/US2021/048820—ISA/EPO—Dec. 14, 2021.

Moderator (CATT): "FL Summary #2 for Potential Positioning Enhancements", 3GPP Draft, 3GPP TSG RAN WG1 Meeting #102-e, R1-2007111, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, Aug. 22, 2020 (Aug. 22, 2020), XP051921242, 81 Pages, Section 6.3.

Moderator (Intel Corporation) : "Summary of the RAN1 WG E-mail, Discussion [100b-e-NR-Pos-01]", 3GPP Draft, 3GPP TSG RAN WG1 #100bis-E, R1-2002770, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, May 1, 2020 (May 1, 2020), XP051879481, 27 Pages, Section 2.4, p. 1, paragraph 2.1. 1-p. 7, paragraph 2.1.2.

Moderator (Intel Corporation): "FL Summary #1 for AI 7.2.8.1—DL Reference Signals for NR Positioning", R1-200ZZZZ, e-Meeting, May 25-Jun. 5, 2020, 21 Pages.

Qualcomm Incorporated: "Initial Thoughts on Potential Positioning Enhancements", 3GPP Draft, 3GPP TSG RAN WG1 #101-e, R1-2004492, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886221, pp. 1-14, Sections 1-7, p. 13, Line 7—Line 27, p. 10, sections 4.1, 5.1-5.2, 6-1.

ZTE: "Discussions on Potential NR Positioning Enhancements", 3GPP Draft, 3GPP TSG RAN WG1 Meeting #102-e, R1-2005464, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051917488, 6 Pages, Section 2.1.

* cited by examiner

1000

| Frequency band or band combination | Band | Capable of processing simultaneously-received PFLs? |
|---|---|---|
| FB1-FB2 | | 1 |
| FB1-FB3 | FB1 | 1 |
| | FB3 | 0 |
| FB5 | | 0 |

FIG. 10

1100

| Frequency band combination | Band | Number of receive-signal paths | Measurement accuracy |
|---|---|---|---|
| FB1-FB2 | | 2 | Param1 |
| FB3-FB4 | FB3 | 2 | Param1 |
| | FB4 | 2 | Param1 |
| FB4-FB5-FB6 | FB4 | 1 | Param2 |
| | FB5 | 3 | Param3 |
| | FB6 | 2 | Param2 |
| FB2 | | 4 | Param4 |

FIG. 11

1200

| Frequency band or band combination | Band in band combination | Number of concurrent PFLs | Number of receive-signal paths (per PFL or total) |
|---|---|---|---|
| FB1-FB2 | | 1 | 4 |
| FB1-FB2 | | 2 | 1 |
| FB1-FB3 | FB1 | | floor(N/K), N=4 |
| | FB3 | | 1 |
| FB5 | | | floor(N/K), N=2 |

FIG. 12

1300

| Frequency band or band combination | Band in band combination | Measurement accuracy set |
|---|---|---|
| FB1-FB2 | | Set1 |
| FB1-FB3 | FB1 | Set2 |
| | FB3 | Set3 |
| FB5 | | Set1 |

FIG. 13

RECEIVE-SIGNAL PATH ALLOCATION FOR MULTIPLE POSITIONING FREQUENCY LAYER PROCESSING

CROSS-REFERENCE TO RELATED APPLICATIONS

This application is a continuation of application Ser. No. 17/463,677, filed Sep. 1, 2021, entitled "RECEIVE-SIGNAL PATH ALLOCATION FOR MULTIPLE POSITIONING FREQUENCY LAYER PROCESSING", which claims the benefit of U.S. Provisional Application No. 63/078,956, filed Sep. 16, 2020, entitled "RECEIVE-SIGNAL PATH ALLOCATION FOR MULTIPLE POSITIONING FREQUENCY LAYER PROCESSING", both of which are assigned to the assignee hereof, and the entire contents of both of which are hereby incorporated herein by reference.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example user equipment includes: an interface comprising a plurality of receive-signal paths; a memory; and a processor, communicatively coupled to the interface and the memory, configured to: transmit, via the interface to a network entity, a capability indication indicating that the user equipment is capable of processing a plurality of positioning reference signals, of a plurality of different frequencies corresponding to different frequency layers, that at least partially overlap in receipt time at the user equipment; and measure the plurality of positioning reference signals that are received by the interface at least partially overlapping in time.

Another example user equipment includes: means for transmitting, a network entity, a capability indication indicating that the user equipment is capable of processing a plurality of positioning reference signals, of a plurality of different frequencies corresponding to different frequency layers, that at least partially overlap in receipt time at the user equipment; and means for processing the plurality of positioning reference signals that are received by the user equipment at least partially overlapping in time.

An example signal processing method includes: transmitting, to a network entity from a user equipment, a capability indication indicating that the user equipment is capable of processing a plurality of positioning reference signals, of a plurality of different frequencies corresponding to different frequency layers, that at least partially overlap in receipt time at the user equipment; receiving the plurality of positioning reference signals at the user equipment at least partially overlapping in time; and processing the plurality of positioning reference signals at the user equipment in accordance with the capability indication.

An example non-transitory, processor-readable storage medium includes processor-readable instructions configured to cause a processor of a user equipment, in order to processing signals at the user equipment, to: transmit, to a network entity from the user equipment, a capability indication indicating that the user equipment is capable of processing a plurality of positioning reference signals, of a plurality of different frequencies corresponding to different frequency layers, that at least partially overlap in time at the user equipment; and process the plurality of positioning reference signals in accordance with the capability indication.

BRIEF DESCRIPTION OF THE DRAWINGS

FIG. 10 is a simplified diagram of a capability indication indicating whether a user equipment is capable of processing multiple positioning frequency layers received at least partially overlapping in time.

FIG. 11 is a simplified diagram of a capability indication indicating quantities of receive-signal paths and measurement accuracies for processing multiple positioning frequency layers received at least partially overlapping in time.

FIG. 12 is a simplified diagram of a capability indication indicating quantities of receive-signal paths, and quantities of positioning frequency layers, for processing positioning frequency layers received at least partially overlapping in time.

FIG. 13 is a simplified diagram of a capability indication indicating measurement accuracies for processing positioning frequency layers received at least partially overlapping in time.

DETAILED DESCRIPTION

Figure 1:
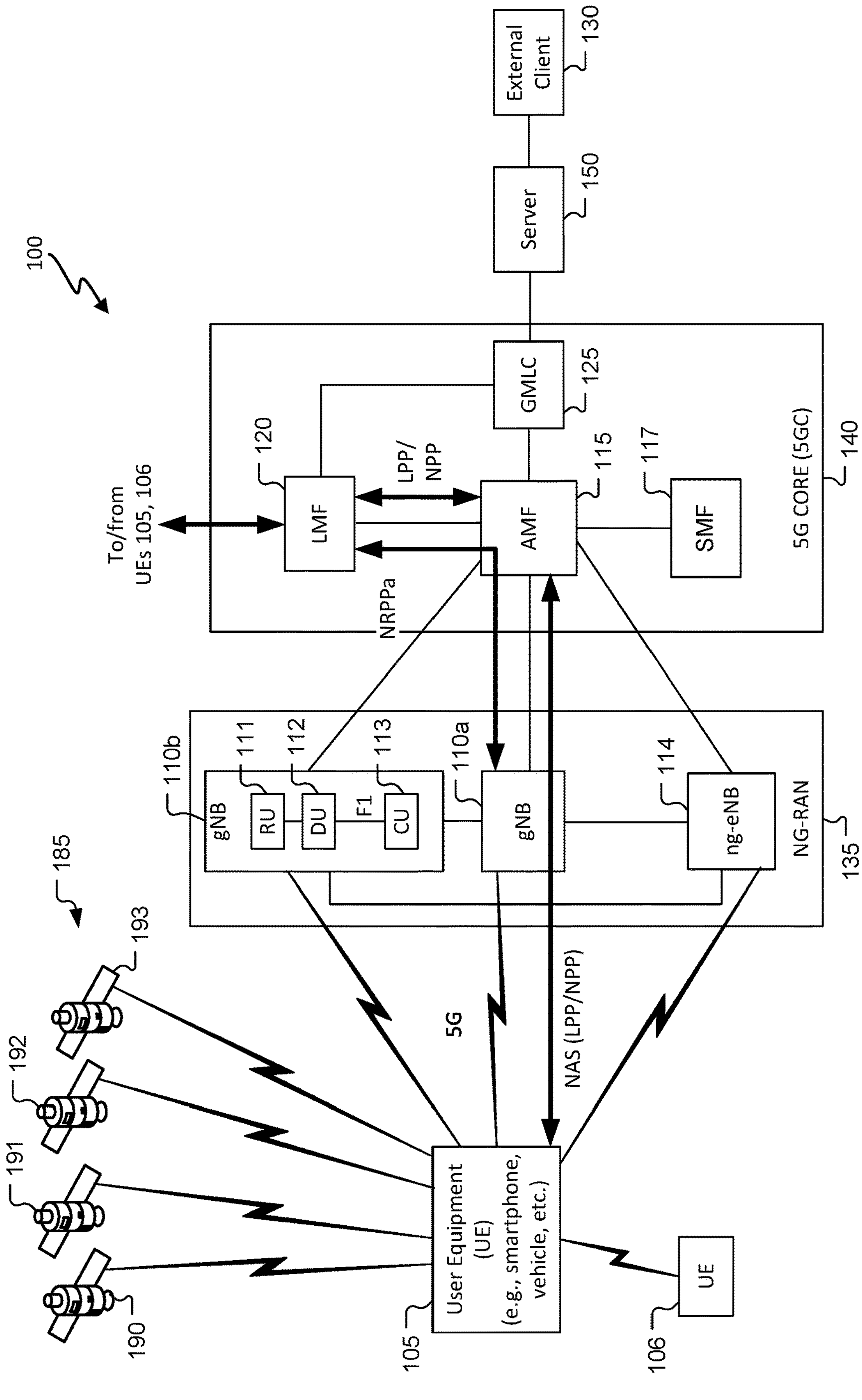
FIG. 1 is a simplified diagram of an example wireless communications system.

Techniques are discussed herein for allocating receive-signal paths for processing positioning reference signals received at least partially overlapping in time. For example, a UE (user equipment) may assign one or more receive-signal paths for receiving positioning reference signals in different positioning frequency layers at least partially overlapping time. The UE may send a capability message to one or more network entities indicating the capability of the UE to process positioning reference signals received at least partially overlapping in time. The capability message may indicate the assignment of the one or more receive-signal paths and/or measurement accuracy providable by the UE for positioning frequency layers at least partially overlapping in receipt time, e.g., for different bands, or band combinations, or bands in band combinations. Other examples, however, may be implemented.

Items and/or techniques described herein may provide one or more of the following capabilities, as well as other capabilities not mentioned. Processing power may be managed for processing positioning reference signals received at least partially overlapping in time. Expectations may be managed for position information accuracy for processing positioning reference signals received at least partially overlapping in time. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IOT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (cNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IOT), enhanced mobile broadband (cMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-cNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110*a*, 110*b* and/or the ng-eNB 114 may be configured to communicate with the UE 105 via multiple carriers. Each of the gNBs 110*a*, 110*b* and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IOT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*a* includes an RU 111, a DU 112, and a CU 113. The RU 111, DU 112, and CU 113 divide functionality of the gNB 110*a*. While the gNB 110*a* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*a*. The DU 112 hosts the Radio Link Control (RLC), Medium Access Control (MAC), and physical layers of the gNB 110*a*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*a*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-cNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-cNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-cNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-cNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
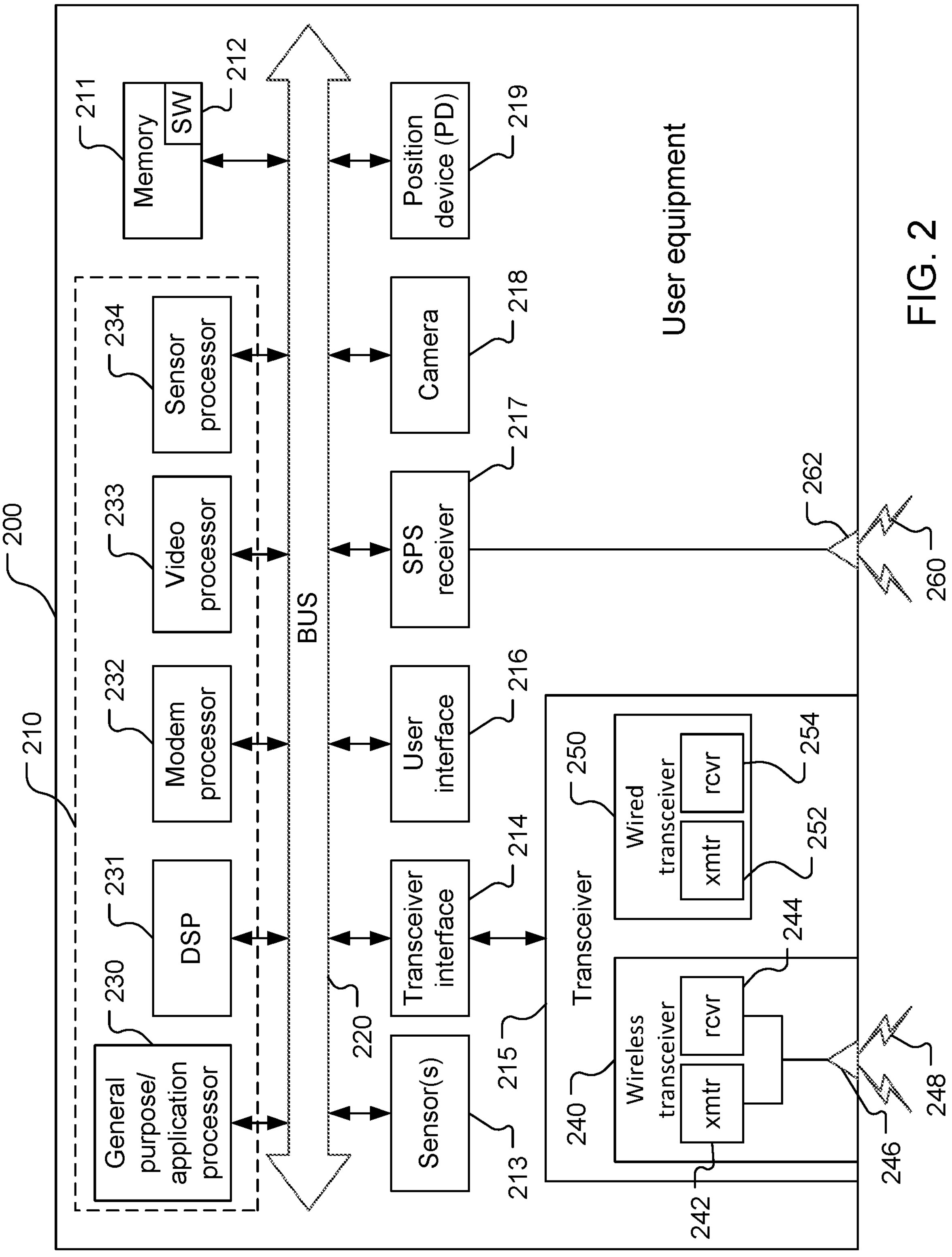
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
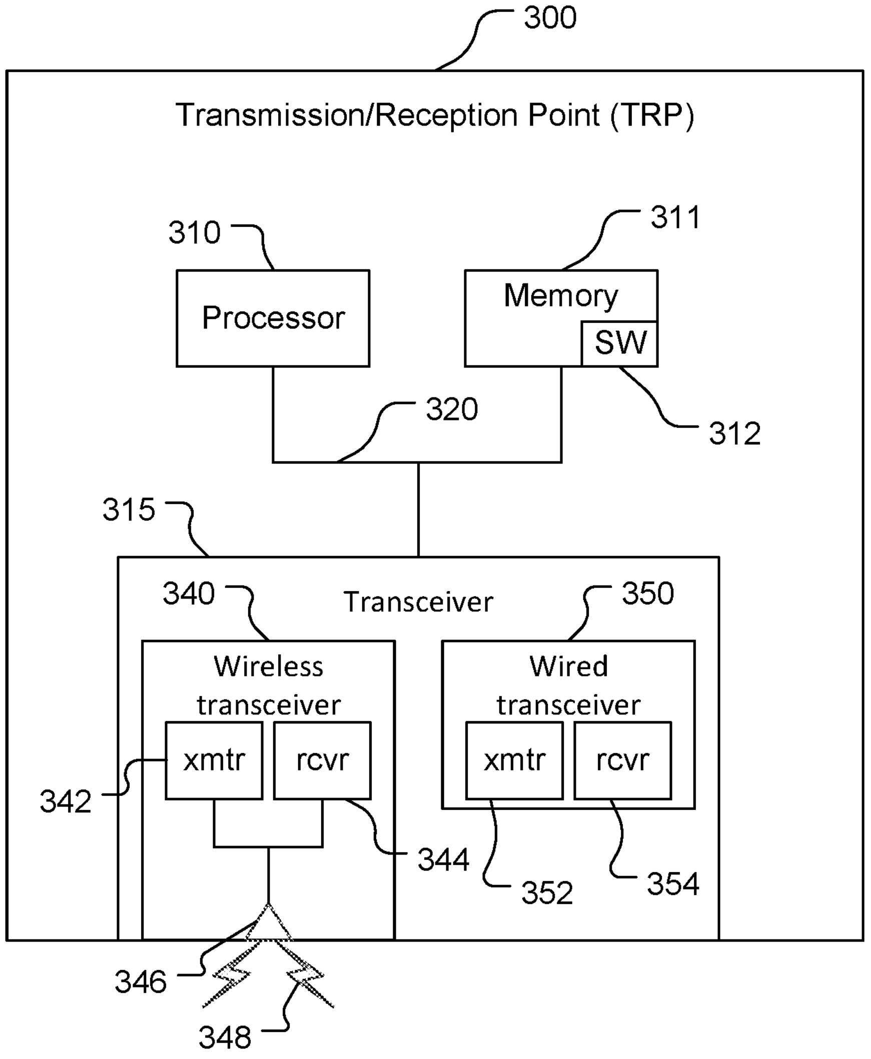
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
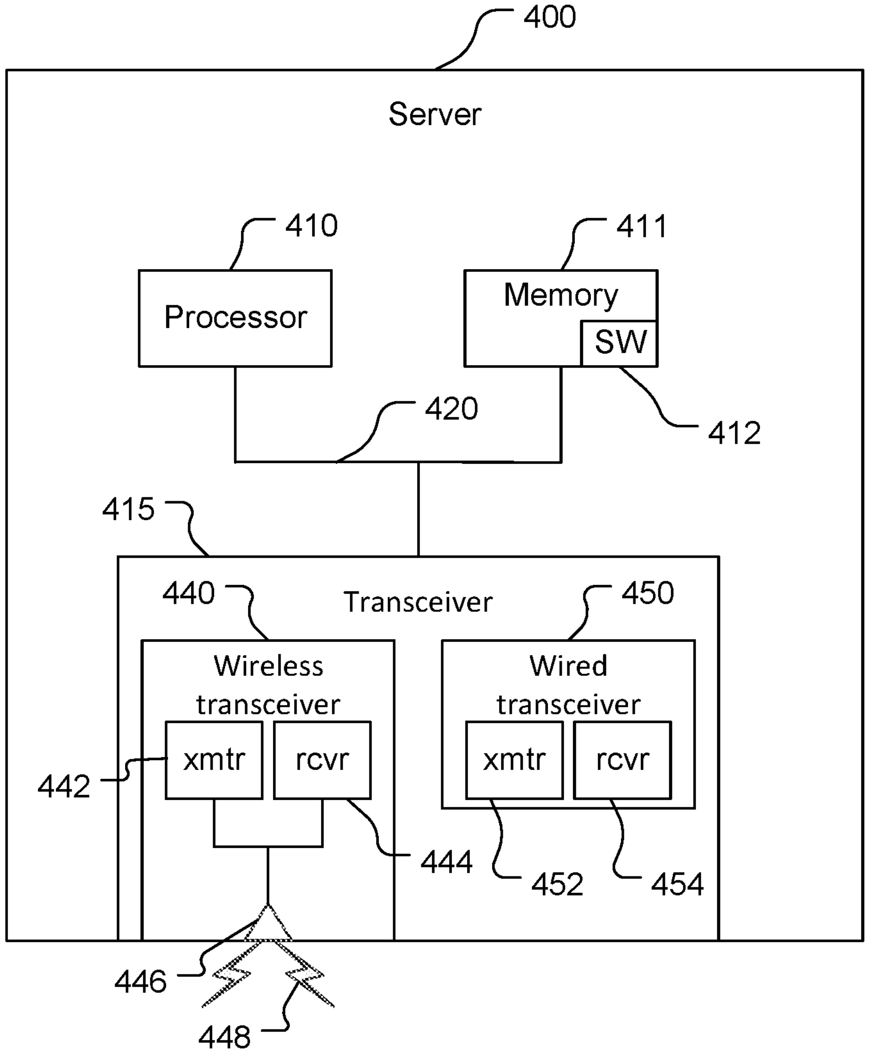
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference TRx-Tx (i.e., UE TRx-Tx or UERx-Tx) between the ToA of the RTT measurement signal and the transmission time of the RTT response message in a payload of each RTT response message. The RTT response message would include a reference signal from which the base station can deduce the ToA of the RTT response. By comparing the difference TTx-Rx between the transmission time of the RTT measurement signal from the base station and the ToA of the RTT response at the base station to the UE-reported time difference TRx-Tx, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS ((Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Overlapping Positioning Reference Signal Reception

A UE may receive PRS to determine position information (e.g., one or more measurements, ranges, position estimates, etc.). The discussion herein refers to requesting PRS, but the term PRS includes PRS and/or SRS for positioning, and includes such signals whether the signals are DL, UL, or SL. These signals may also be referred to as NRS (Navigation Reference Signal(s)). The UE may receive multiple PRS in multiple different frequency layers (called PFLs or positioning frequency layers) at least partially overlapping in time. That is, at least a respective portion of each of the multiple signals may be received by the UE at the same time, or one signal may be received over a first time span and a second signal may be received over a second time span that overlaps the first time span (e.g., the first time span begins before a beginning of the second time span and ends after a beginning of the second time span). The UE, however, may not process the received signals from all antennas of the UE that receive the signals, e.g., because the UE is unable to do so or does not do so for one or more other reasons, e.g., to conserve power.

PRS are defined for NR positioning for UEs to detect and measure one or more neighbor entities, e.g., TRPs, UEs. Several configurations of PRS are supported to enable a variety of deployments (e.g., indoor, outdoor, sub-6 GHz, mm-Wave). For example, Table 1 shows various reference signals, the corresponding release of the 3GPP standard, corresponding UE measurement(s), and corresponding positioning technique(s) for which the reference signal(s) may be used.

TABLE 1

| DL/UL RS | UE measurement(s) | Positioning technique(s) |
|---|---|---|
| Rel. 16 DL PRS | DL RSTD | DL-TDOA |

TABLE 1-continued

| DL/UL RS | UE measurement(s) | Positioning technique(s) |
|---|---|---|
| Rel. 16 DL PRS | DL PRS RSRP | DL-TDOA, DL-AoD, Multi-RTT |
| Rel. 16 DL PRS/ Rel. 16 SRS for positioning | UE Rx-Tx | Multi-RTT |
| Rel. 15 SSB/CSI-RS for RRM | SS-RSRP (RSRP for RRM), SS-RSRQ (for RRM), CSI-RSRP (for RRM), CSI-RSRQ (for RRM) | E-CID |

Figure 5:
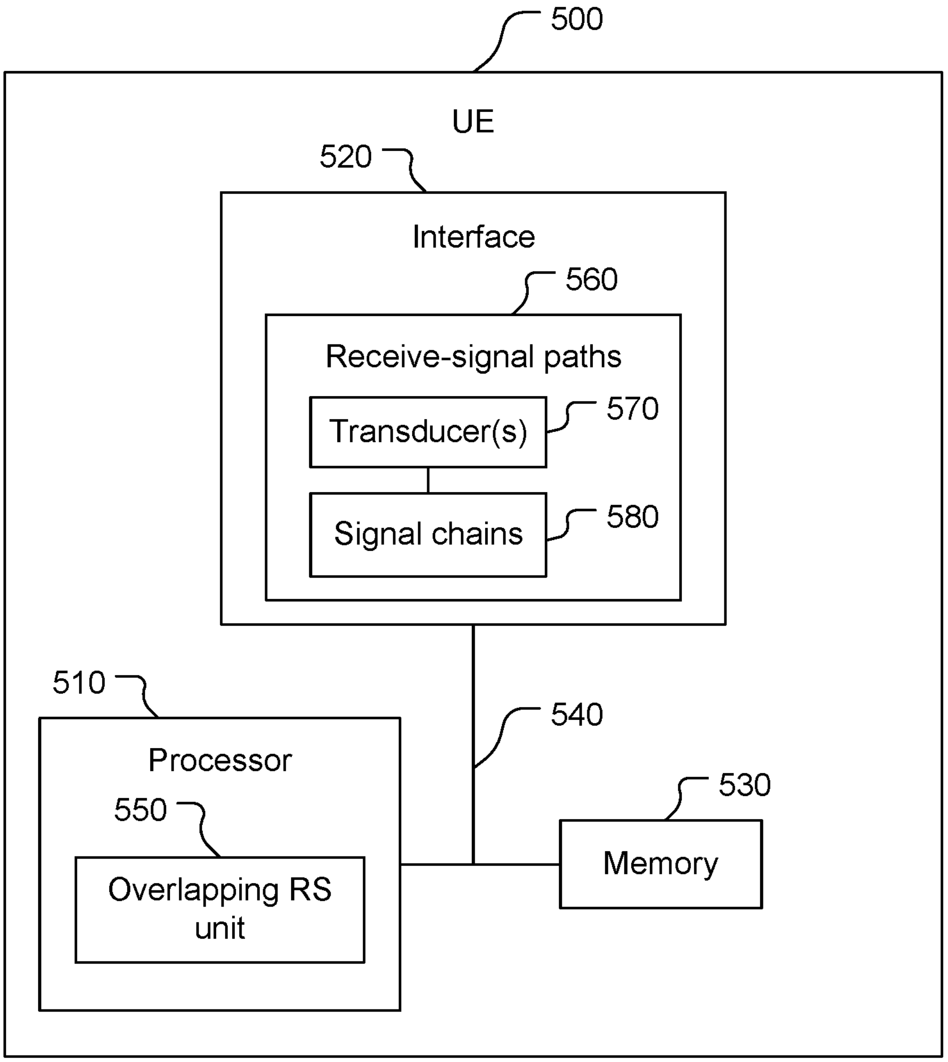
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the SPS antenna 262. The memory 530 may be configured similarly to the memory 211, e.g., including software with processor-readable instructions configured to cause the processor 510 to perform functions.

The interface 520 includes multiple receive-signal paths 560. For example, the interface 520 may include two, four, eight, or more receive-signal paths 560 for receiving PRS (or other signals). The receive-signal paths 560 include one or more transducers 570 (configured to transduce between wireless and wired (including optical) signals) and multiple signal chains 580 (configured to convey the wired signals to/from the processor 510). Each of the receive-signal paths 560 comprises a combination of one of the tranducer(s) 570 communicatively coupled to one of the signal chains 580, although multiple receive-signal paths 560 may share a single one of the transducer(s) 570 (a single one of the transducer(s) 570 may be connected to multiple signal chains 580). One or more of the one or more transducers 570 may include an array of transducer elements. One or more of the signal chains 580 may include a tuner for adjusting frequencies that may be received by the corresponding transducer 570. One or more of the signal chains 580 may include, for example, one or more phase shifters (not shown) for electronically beam steering a corresponding one of the transducer(s) 570 (e.g., for receiving a signal of a particular angle of arrival) and/or one or more frequency filters (not shown), e.g., for isolating signals of a particular frequency band.

Figure 6:
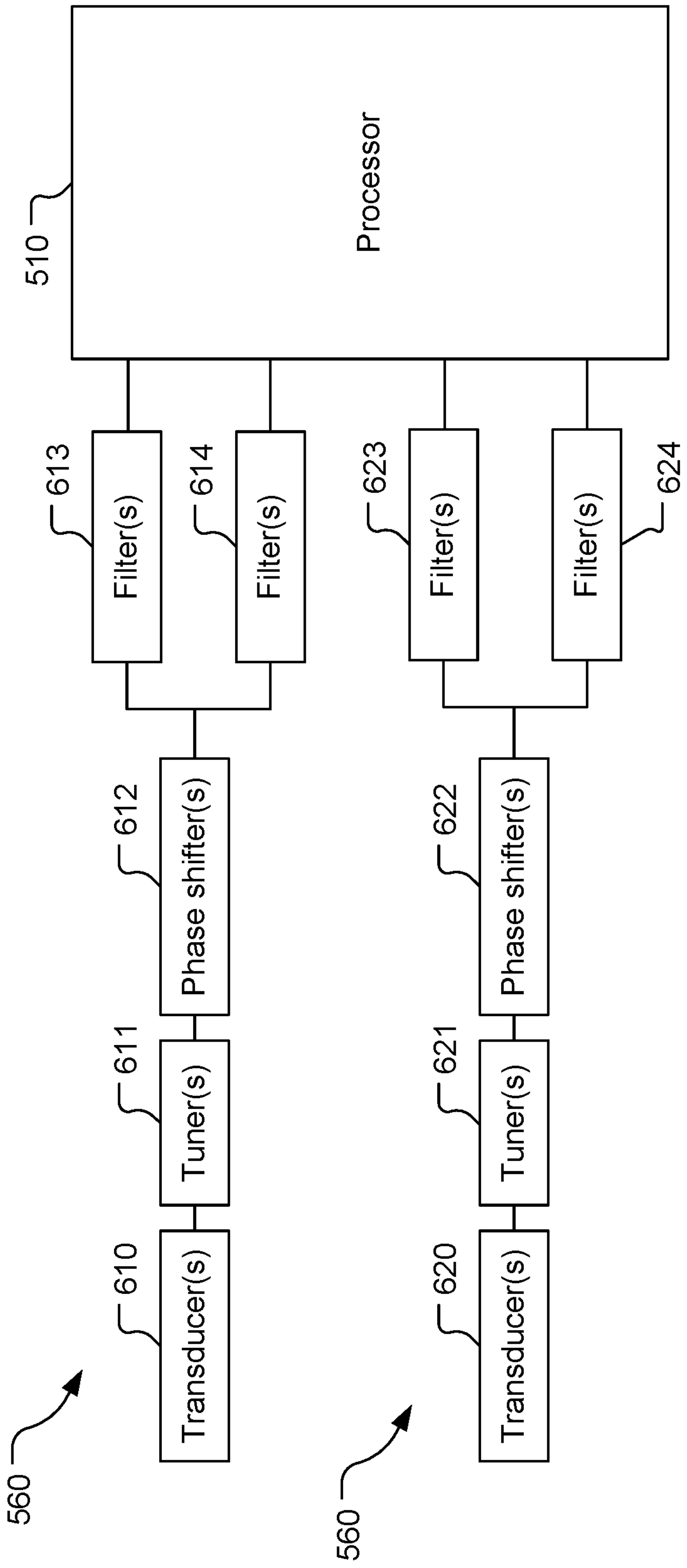
FIG. 6 is a simplified diagram of examples of receive-signal paths shown in FIG. 5.

Referring also to FIG. 6, multiple receive-signal paths 560 may be provided. One or more transducers 610, 620 may be coupled to one or more respective tuners 611, 621 that may be coupled to one or more respective phase shifters 612, 622 that may be coupled to one or more filters 613, 623 and one or more filters 614, 624 to receive one or more signals from one or more desired AoAs and to provide the signal(s) to the processor 510, e.g., for measurement. The tuner(s) 611, 621, the phase shifter(s) 612, 622, and the filter(s) 613, 614, 623, 624 are optional, and any one or more of these items may be omitted. The tuner(s) 611, the phase shifter(s) 612 and the filter(s) 613, 614 provide two of the signal chains 580. The transducer(s) 610 and the two signal chains 580 provide two receive-signal paths. The transducer(s) 610 may comprise one or more antenna panels. The tuner(s) 611 may be adjusted under the control of the processor 510 such that the transducer(s) 610 are tuned to receive different frequencies (e.g., signals of different frequency bands). The phase shifter (s) 612 may be controlled by the processor 510 to provide different phase shifts to the transducer(s) 610 to steer a beam of the transducer(s) 610. The filter(s) 613, 614 may be configured to block or allow desired signal frequencies, and may be controlled by the processor 510 to change what frequencies are blocked/passed. The transducer(s) 620, the tuner(s) 621, the phase shifter(s) 622, and the filter(s) 623, 624 provide functionality similar to the transducer(s) 610, the tuner(s) 611, the phase shifter(s) 612, and the filter(s) 613, 614. One or more of the receive-signal paths 560 may be changed to receive different frequencies and/or different angles of arrival of signals at different times, e.g., by varying phase shifts and/or frequency filters applied to the received signals. The receive-signal paths 560 shown are examples, and other configurations are possible.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes an overlapping RS unit 550. The overlapping RS unit 550 may be configured to determine one or more capabilities of the UE 500 to process multiple PRS that are received by the interface 520 at least partially overlapping in time, and/or to report to a network entity (e.g., the TRP 300) the one or more capabilities of the UE 500 for processing multiple PRS that are received by the interface 520 at least partially overlapping in time. The configuration and functionality of the overlapping RS unit 550 is discussed further herein, with the overlapping RS unit 550 being configured to perform the functionality described as being performed by the overlapping RS unit 550.

Figure 7:
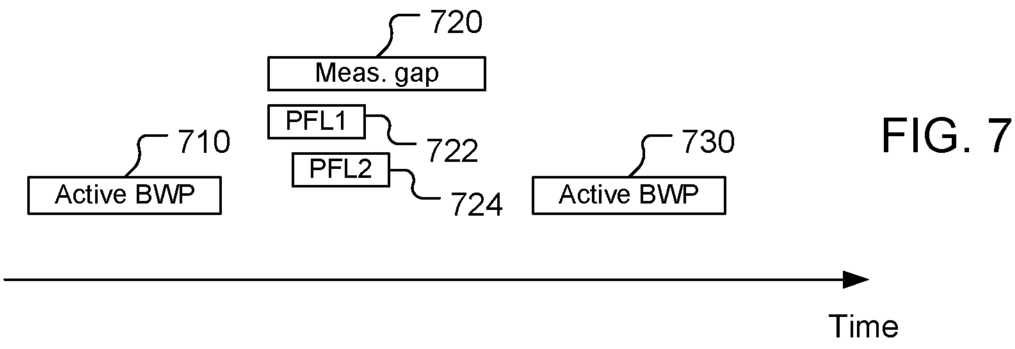
FIG. 7 is a timing diagram of multiple positioning frequency layers being received simultaneously.
Figure 8:
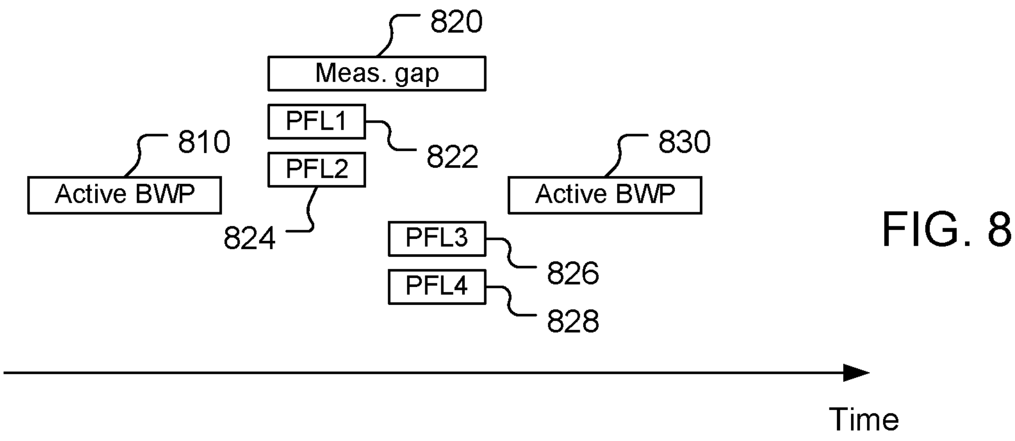
FIG. 8 is a timing diagram of multiple positioning frequency layers being received in a single measurement gap, with each of multiple sets of multiple positioning frequency layers being received simultaneously.
Figure 9:
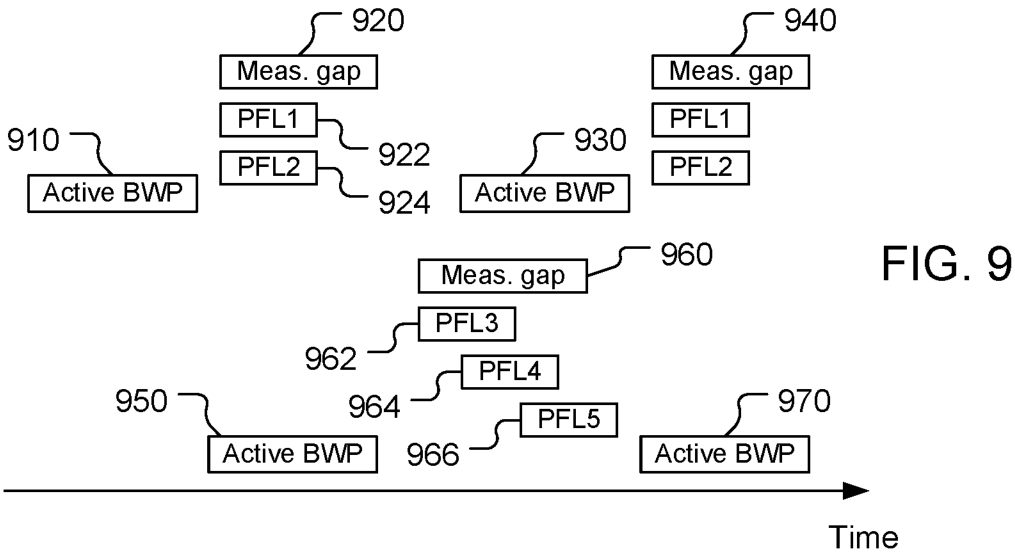
FIG. 9 is a timing diagram of one set of multiple positioning frequency layers being received simultaneously and another set of multiple positioning frequency layers being received simultaneously but time division multiplexed with the other set.

Referring also to FIGS. 7-9, multiple PRS may be received by the UE in multiple corresponding positioning frequency layers (PFLs). For example, an active BWP 710 (bandwidth part, which is a contiguous set of RBs occupying some or all of a channel bandwidth) may be followed by an MG 720 (measurement gap 720) followed by another active BWP 730. During the MG 720, signals in two different PFLs 722, 724 may be received. As shown in FIG. 7, the PFLs 722, 724 partially overlap in time, but do not completely overlap in time. This is an example, and the PFLs 722, 724 may be co-extensive in time, overlapping over their entire respective times. Signals of PFLs that at least partially overlap in time are considered concurrent signals (simultaneous signals) or concurrent PFLs (simultaneous PFLs) as at least portions of the signals are considered to be concurrently (simultaneously) received. The PFLs 722, 724 are distinct in that the PFLs 722, 724 correspond to different frequencies, i.e., span different bandwidths, although the bandwidths may at least partially overlap. As another example, signals of PFLs 822, 824, 826, 828 may be received during an MG 820 between active BWPs 810, 830.

In this example, the PFLs 822, 824 are concurrently received and the PFLs 826, 828 are concurrently received, with the PFLs 822, 824 being time division multiplexed (TDMed) relative to the PFLs 826, 828 but within the same MG. As another example, signals of PFLs 922, 924 may be received during an MG 920 between active BWPs 910, 930, and PFLs 962, 964, 966 may be received during an MG 960 between active BWPs 950, 970. The PFLs 922, 924 may be received again in one or more later MGs, e.g., an MG 940. In this example, the PFLs 922, 924 are concurrently received and the PFLs 962, 964, 966 are concurrently received, with the PFLs 922, 924 being time division multiplexed (TDMed) relative to the PFLs 962, 964, 966 in different MGs. The PFLs 962, 964, 966 are considered to be simultaneously received even though all three of the PFLs 962, 964, 966 span different times and do not overlap at the same time (the PFLs 962, 966 do not overlap in time, but the PFLs 962, 964 overlap and the PFLS 964, 966 overlap). The example timings of PFLs shown in FIGS. 7-9 are examples, and numerous other timings are possible.

The processor 510, e.g., the overlapping RS unit 550, may be configured to provide an indication that the UE 500 can process multiple signals of multiple PFLs that are received at least partially overlapping in time. The processor 510 may be configured to indicate that the UE 500 may process multiple simultaneous PFLs, i.e., that are received at least partially overlapping in time. The terms simultaneous and concurrent, and variations thereof (e.g., simultaneously and concurrently) are used interchangeably herein. The overlapping RS unit 550 may be configured to indicate a quantity of the receive-signal paths 560 from which the processor 510 may process signals from different PFLs that were simultaneously received (i.e., received at least partially overlapping in time even if resource elements of different PFLs never overlap in time). Also or alternatively, the overlapping RS unit 550 may be configured to indicate a measurement accuracy that the processor 510 may provide by processing signals from different PFLs that were simultaneously received.

The UE 500, e.g., the overlapping RS unit 550, may be configured to support processing of simultaneously-received PRS of multiple PFLs, e.g., while limiting RF complexity of the UE 500. For example, the overlapping RS unit 550 may assign the receive-signal paths 560 to groups of receive-signal paths from which respective signals of PFLs are processed. The overlapping RS unit 550 may, for example, assign the receive-signal paths 560 to K groups of antennas to process K PFLs received by the UE 500 simultaneously. Measurement accuracy for each PFL may be a function of the number of receive-signal paths, N, that the UE 500 may assign for receiving each PFL to be processed, e.g., that are capable of receiving the PFL(s) (e.g., have a transducer 570 tuned for receiving the frequency span of the PFL). For example, to process a single PFL, the UE 500 may be expected to assign all N receive-signal paths 560 to the PFL. As another example, for processing two or more simultaneously-received PFLs, the UE 500 may be expected to assign at least floor(N/K) receive-signal paths 560 for each PFL, where K is the number of PFLs. The floor function rounds down to the nearest integer such that floor(N/3)=1, where N=4. Thus, for processing two, three, or four simultaneously-received PFLs with four total receive-signal paths 560 available, the UE 500 may be expected to use at least floor(4/2)=2 receive-signal paths 560 per PFL, at least floor(4/3)=1 receive-signal paths 560 per PFL, and at least floor(4/4)=1 receive-signal path 560 for each PFL, respectively.

The UE 500 may be statically or dynamically configured to use at least a specified number of the receive-signal paths 560 for processing of simultaneously-received PFLs. For example, a specified quantity of the receive-signal paths 560 may be statically configured, e.g., stored in the memory 530 during manufacture of the UE 500, for processing simultaneously-received PFLs for each of various parameters or combinations of parameters, e.g., frequency bands, frequency band combinations, frequency bands within frequency band combinations, etc. As another example, a specified quantity of the receive-signal paths 560 may be dynamically configured, e.g., being sent to the UE 500, e.g., by the TRP 300 or the server 400 (or another entity). A dynamically-specified quantity may override a statically-specified quantity, and the statically-specified quantity may serve as a default in the absence of a dynamically-specified quantity. The statically or dynamically specified quantity may be one for every parameter or parameter combination (in which case parameters or parameter combinations need not be specified), or may vary for different parameters or parameter combinations. The specified quantity may, for example, be a single one of the receive-signal paths 560. The overlapping RS unit 550 may be configured to indicate that the UE 500 is capable of processing simultaneously-received PFLs based on the UE 500 being capable of such processing with at least the number of specified receive-signal paths 560.

Also or alternatively, the UE 500 may be statically or dynamically configured to provide a specified measurement accuracy. As with the quantity of receive-signal paths 560, a measurement accuracy may be specified for one or more parameters and/or parameter combinations, a dynamically-specified measurement accuracy may override a statically-specified measurement accuracy, and a statically-specified measurement accuracy may serve as a default measurement accuracy. The UE 500 may be configured to determine, or may be statically programmed to select, whether to use a specified quantity of antennas or provide a specified measurement accuracy if both are specified. The specified measurement accuracy may, for example, be the measurement accuracy corresponding to measurement with a single one of the receive-signal paths 560. The overlapping RS unit 550 may be configured to indicate that the UE 500 is capable of processing simultaneously-received PFLs based on the UE 500 being capable of such processing while providing at least the specified measurement accuracy for each respective PFL.

Referring to FIG. 10, with further reference to FIG. 5, the overlapping RS unit 550 may be configured to provide a capability indication as to the capability of the UE 500 to process simultaneously-received PFLs. In the example shown in FIG. 10, a capability indication 1000 includes indications by band, or band combination, or band in a band combination, as to whether the UE 500 can process simultaneously-received PFLs. A capability indication may include only indications of bands, or only band combinations, or only band in band combinations, or may include combinations of two or more of these frequency conditions for indicated simultaneously-received PFL processing capability. Here, the capability indication 1000 indicates (by a single-bit value of a "1") that the UE 500 can process simultaneously-received PFLs in a band combination of frequency band 1 (FB1) and frequency band 2 (FB2), that the UE 500 can process simultaneously-received PFLs in FB1 but not frequency band 3 (FB3) in a band combination of FB1 and FB3, and that the UE 500 cannot process simultaneously-received PFLs in frequency band 5 (FB5).

The capability indication 1000 may be coded such that the capability indication 1000 does not provide indications of band, band combination, or band in band combination, but has bits in appropriate places corresponding to bands, band combinations, and/or bands in band combinations to indicate whether the UE 500 can process simultaneously-received PFLs. As no indication of a quantity of the receive-signal paths 560 or measurement accuracy is provided, the capability indication 1000 implicitly indicates that the UE 500 can satisfy (i.e., provide at least) an appropriate default quantity of receive-signal paths or satisfy (i.e., provide at least) an appropriate default measurement accuracy for FB1 of the frequency band combination of FB1 and FB3, and for FB1 and FB2 of the frequency band combination of FB1 and FB2.

Referring also to FIG. 11, the overlapping RS unit 550 may be configured to provide a capability indication 1100 indicating specific quantities of the receive-signal paths 560 and/or specific measurement accuracies. The capability indication 1100 includes both quantities of the receive-signal paths 560 and measurement accuracies, but one or more of the quantities and/or one or more of the accuracies may be omitted, e.g., the quantities omitted altogether, or the accuracies omitted altogether, or both the quantities and the accuracies omitted altogether, or one or more quantities indicated and one or more quantities omitted and/or one or more accuracies indicated and one or more accuracies omitted. In the example shown in FIG. 11, the capability indication 1100 includes indications by band, or band combination, or band in a band combination as to the number of the receive-signal paths 560 that may be used, or the measurement accuracy that may be provided, for the respective band, band combination, or band in band combination. The measurement accuracies may each include one or more appropriate parameters (e.g., RSTD, Rx-Tx, RSRP maximum errors for specified test cases), with Param1, Param2, Param3, Param4 each representing one or more parameter values. A capability indication may include only indications of bands, or only band combinations, or only band in band combinations, or may include combinations of two or more of these frequency conditions for indicated simultaneously-received PFL processing capability. The capability indication 1100 may also include indications, similar to the capability indication 1000, of whether the UE 500 can process simultaneously-received PFLs, but these explicit indications may be omitted as the indications of non-zero values for the number of receive-signal paths and/or the measurement accuracy may serve as implicit indications of such capability. The sum of the quantities of the receive-signal paths 560 indicated in the capability indication 1100 (or other indication) for a single band combination may exceed the total number of the receive-signal paths 560 capable of use for the band combination. Indeed, it may be possible that all of the receive-signal paths 560 capable of use for a band combination may be used for each of the bands in the band combination. Further, the indicated numbers of the receive-signal paths 560 and/or the indicated measurement accuracies may be the actual or minimum numbers of the receive-signal paths 560 and/or the actual or minimum measurement accuracies that the UE 500 will use/provide. If the values are minimum values, then the UE 500 may use more than the indicated number of the receive-signal paths 560 and/or provide better measurement accuracy than indicated.

The overlapping RS unit 550 may specify a maximum number of PFLs corresponding to an indicated number of the receive-signal paths and/or a determined measurement accuracy. The measurement accuracy may be determined in that the measurement accuracy may be hard-coded in memory and read from the memory, may be determined by reading a received indication of the measurement accuracy, and/or implicitly determined, e.g., by decoding a received message based on a table of measurement accuracies.

Each of the quantities of the receive-signal paths 560 indicated in the capability indication 1100 (or other capability indication) may be a (minimum) quantity of the receive-signal paths 560 used to receive each PFL of the corresponding band, band combination, or band in band combination. In this case, the indicated quantity of the receive-signal paths 560 will be shared by all the PFLs of the corresponding band/band combo/band in band combo.

The overlapping RS unit 550 may indicate the total number, N, of receive-signal paths available for a given band, band combination, and/or band in band combination (i.e., band/band combination/band in band combination) and the number of receive-signal paths used for each PFL may be determined based on a statically configured protocol. For example, the UE 500 and the TRP 300 (and/or the server 400) may be statically configured (e.g., per an industry standard specification) to divide the indicated number of receive-signal paths in some manner, e.g., evenly if possible, rounding down if uneven (e.g., floor(N/K)), or a protocol for determining specific quantities that may not be equal for different PFLs.

Referring also to FIG. 12, the overlapping RS unit 550 may produce a capability indication to indicate the number of the receive-signal paths 560 based on the number of PFLs to be received in the respective band/band combo/band in band combo. For example, the overlapping RS unit 550 may determine the receive-signal path quantity as all of the receive-signal paths 560 available for a given band/band combo/band in band combo, as a default value (e.g., one), or as a function (e.g., floor(K/N) with K being the number of PFLs and N being the number of capable receive-signal paths). In this example, a capability indication 1200 includes different quantities of receive-signal paths for the band combination FB1-FB2 based on whether there is one PFL received of two PFLs simultaneously received. Further, the capability indication 1200 indicates for the band FB3 in the band combination FB1 and FB3 that a minimum of one receive-signal path per PFL will be used regardless of the number of PFLs (because the quantity of PFLs is blank and thus implicitly indicated as 0, indicating whatever quantity). The indicated number of receive-signal paths may be for each PFL, or may be a total to be divided among the PFLs (e.g., according to a protocol). For example, the capability indication 1200 indicates for the band FB1 of the band combination of FB1 and FB3, and for a band FB5, that the number of receive-signal paths 560 is a function floor(N/K), and provides a value for N in each case (i.e., the total number of receive-signal paths capable of receiving the respective band/band combo/band in band combo). The TRP 300 may thus determine the number of the receive-signal paths 560 based on the scheduled number of PFLs to be simultaneously received by the UE 500.

Referring also to FIG. 13, the overlapping RS unit 550 may produce a capability indication, e.g., a capability indication 1300, to indicate a measurement accuracy set corresponding to a respective band/band combo/band in band combo. For example, the overlapping RS unit 550 may determine the measurement accuracy set, Set1, as a measurement accuracy corresponding to a quantity of the receive-signal paths 560 to be used, e.g., with this quantity determined from floor(K/N). As another example, the overlapping RS unit 550 may assign a measurement accuracy as a second set, Set2, based on each PFL being assigned one receive-signal path. As another example, the overlapping RS unit 550 may assign a measurement accuracy as a third set, Set3, containing all of the receive-signal paths 560 capable of receiving the PFLs of the respective band/band combo/band in band combo. The overlapping RS unit 550 may specify a maximum number of PFLs for Set3 applicability.

The overlapping RS unit 550 may provide a capability indication dynamically to the TRP 300, the server 400 (e.g., a location server such as an LMF), and/or another entity. The overlapping RS unit 550 may provide capability indications with different values over time, e.g., based on changing power constraints (e.g., in response to the UE 500 attempting to reduce power consumption), and/or based on one or more other factors. The overlapping RS unit 550 may, for example, send a capability indication dynamically using a MAC-CE (Medium Access Control-Control Element) message.

The capability indications 1000, 1100, 1200, 1300 are examples and not limiting of the disclosure as numerous variations of capability indications may be used. For example, different combinations of information may be included. As another example, bands corresponding to one or more of a variety of frequency ranges may be indicated (e.g., FR1, FR2, FR3, FR4 (i.e., FR2x)).

Figure 14:
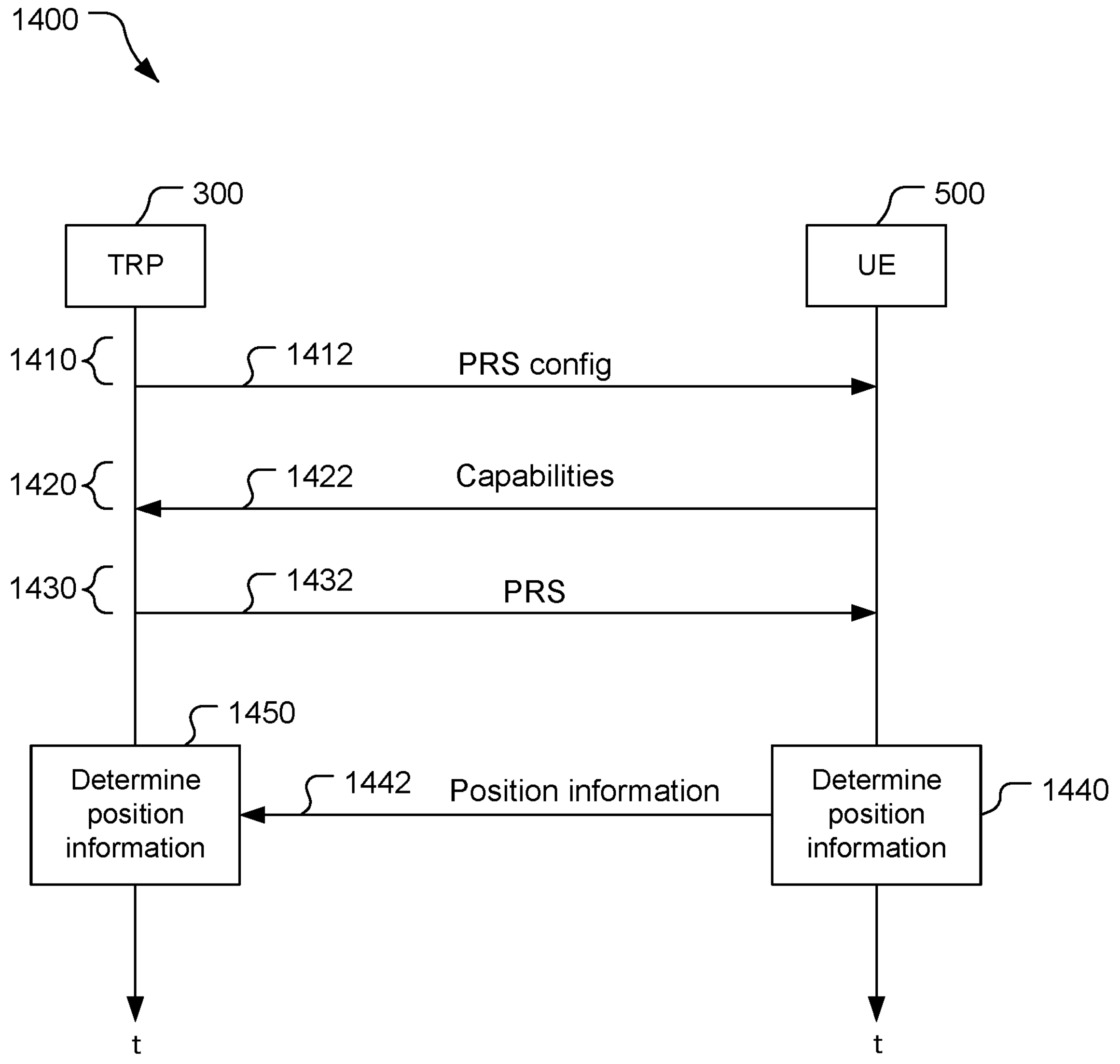
FIG. 14 is a processing and signal flow for determining position information.

Referring to FIG. 14, with further reference to FIGS. 1-13, a processing and signal flow 1400 for determining position information includes the stages shown. The flow 1400 is an example, and stages may be added to, removed from, and/or rearranged in the flow 1400.

At stage 1410, the TRP 300 sends a PRS configuration message 1412 to the UE 500. The PRS configuration message 1412 may indicate the resource configuration parameters for one or more PRS (e.g., DL-PRS or SL-PRS), to be sent to the UE 500. The parameters may include one or more of comb number, time and/or frequency offset(s), repetition factor, activation time of previously-scheduled RS, etc. The PRS configuration message 1412 may indicate scheduling of the PRS such that the simultaneous reception of PRS corresponding to respective PFLs may be determined.

At stage 1420, the UE 500 sends a capabilities message 1422. The capabilities message 1422 indicates one or more capabilities regarding processing of PFLs that are simultaneously received by the UE 500. For example, the capabilities message 1422 may indicate whether the UE 500 can process PFLs that at least partially overlap in time, numbers of the receive-signal paths 560 that the UE 500 may allocate for use in processing PRS corresponding to a respective band/band combination/band in band combination, measurement accuracy corresponding to a respective band/band combination/band in band combination, etc., examples of which are shown in FIGS. 10-13.

At stage 1430, the TRP 300 may send PRS 1432. The PRS 1432 is sent in accordance with the PRS configuration message 1412. Also or alternatively, the PRS 1432 may be sent to the UE 500 from one or more other sources, e.g., one or more other TRPs 300 and/or one or more other UEs 500. The PRS 1432 may contain PRS of multiple PFLs that arrive at the UE 500 at least partially overlapping in time.

Stages 1410, 1420, 1430 may be repeated, e.g., with the same or different values and/or configurations. For example, the UE 500 can send dynamic capability indications regarding dynamic capabilities of the UE 500 to process PRS of different PFLs that arrive at the UE 500 simultaneously (i.e., at least partially overlapping in time).

At stage 1440, the UE 500 determines position information based on received PRS. For example, the UE 500 may measure PRS from the TRP 300 and/or from another UE 500 to determine position information (e.g., RSRP, ToA, SINR, a position estimate, a range, etc.). The UE 500 may send some or all of the determined position information to the TRP 300 in a position information message 1442.

At stage 1450, the TRP 300 may determine position information. The TRP 300 may, for example, determine a range and/or a position estimate of the UE 500 based on the position information message 1442, and possibly based on one or more other messages with other measurement information. Also or alternatively, another network entity such as the server 400 (e.g., an LMF) may determine position information based on information provided by the TRP 300 and/or one or more other entities such as the UE 500.

Operation

Figure 15:
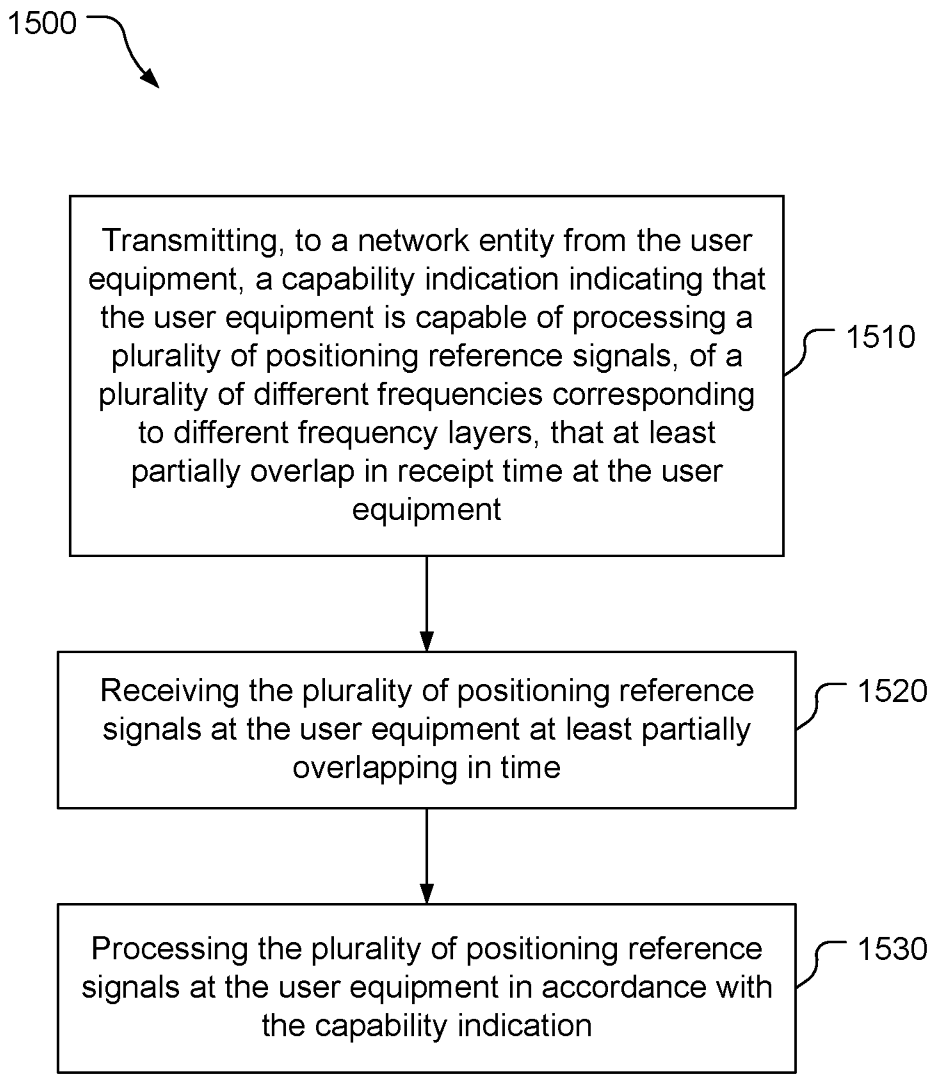
FIG. 15 is a block flow diagram of a signal processing method.

Referring to FIG. 15, with further reference to FIGS. 1-14, a signal processing method 1500 includes the stages shown. The method 1500 is, however, an example only and not limiting. The method 1500 may be altered, e.g., by having stages added, removed, rearranged, combined, performed concurrently, and/or having single stages split into multiple stages.

At stage 1510, the method 1500 includes transmitting, to a network entity from the user equipment, a capability indication indicating that the user equipment is capable of processing a plurality of positioning reference signals, of a plurality of different frequencies corresponding to different frequency layers, that at least partially overlap in receipt time at the user equipment. For example, the overlapping RS unit 550 may send the capability message 1422 to the TRP 300 (e.g., indicating one or more capabilities for processing PRS that at least partially overlap in time as discussed). The processor 510, possibly in combination with the memory 530, in combination with the interface 520 (e.g., the wireless transmitter 242 and the antenna 246) may comprise means for transmitting a capability indication.

At stage 1520, the method 1500 includes receiving the plurality of positioning reference signals at the user equipment at least partially overlapping in time. For example, the UE 500 receives the PRS 1432 with PRS of corresponding PFLs at least partially overlapping in time. The processor 510, possibly in combination with the memory 530, possibly in combination with the interface 520 (e.g., the wireless receiver 244 and the antenna 246) may comprise means for receiving the plurality of positioning reference signals.

At stage 1530, the method 1500 includes processing the plurality of positioning reference signals at the user equipment in accordance with the capability indication. For example, the processing may include conveying the PRS along the assigned receive-signal paths 560 and/or measuring the PRS, e.g., by the processor 510 determining one or more measurement parameters, e.g., ToA, RSRP, etc. The processor 510, possibly in combination with the memory 530, possibly in combination with the interface 520 (e.g., the receive-signal paths 560) may comprise means for processing the plurality of positioning reference signals.

Implementations of the method 1500 may include one or more of the following features. In an example implementation, the capability indication includes at least one of a path quantity or an accuracy capability, the path quantity being a number of receive-signal paths that the user equipment will use to receive the plurality of positioning reference signals. For example, the capability indication may indicate one or more quantities of the receive-signal paths 560 or antennas (or antenna panels, e.g., sets of transducers) that the UE 500 may use for the plurality of positioning reference signals and/or one or more measurement accuracies providable by the UE 500 for the positioning reference signals. In a further example implementation, the capability indication includes a respective frequency band indication corresponding to each of the at least one of the path quantity or the accuracy capability. For example, one or more frequency bands may be indicated in the capability indication. Different frequency bands indicated may have different quantities of receive-signal paths and/or different measurement accuracies indicated. In another further example implementation, the capability indication includes a respective frequency band combination indication corresponding to each of the at least one of the path quantity or the accuracy capability. For example, one or more frequency band combinations may be indicated in the capability indication. Different frequency band combinations indicated may have different quantities of receive-signal paths and/or different measurement accuracies indicated. For example, the capability indication may include one or more frequency band combinations, e.g., as in the capability indications 1000, 1100, 1200, 1300. In a further example implementation, the capability indication consists of a single bit for each respective frequency band combination indicating whether the user equipment is capable of processing respective ones of the plurality of positioning reference signals. For example, one bit may be used for each band combination to indicate whether the UE 500 can process simultaneously-received PFLs. The UE 500 may be statically or dynamically configured (e.g., per a standard) to process each PFL received from one receive-signal path (e.g., through one antenna), with accuracy parameters being a function of the number of receive-signal paths used to receive each PFL. In a further example implementation, for each respective frequency band combination that the capability indication indicates that the user equipment is capable of processing the respective ones of the plurality of positioning reference signals, the method 1500 comprises receiving each of the respective ones of the plurality of positioning reference signals with a single one of the plurality of receive-signal paths absent the capability indication including a value of the path quantity that is greater than one. Thus, the default may be that each PFL is received for processing by a single receive-signal path. In another further example implementation, the capability indication includes a respective band/band-combination indication corresponding to each of the at least one of the path quantity or the accuracy capability, each band/band-combination indication indicating a frequency band of a frequency band combination. For example, the capability indication may indicate one or more specific bands within one or more indicated band combinations, each band in the band combination may have an associated quantity of the receive-signal paths 560 indicated, and/or an associated measurement accuracy indicated. In another further example implementation, the capability indication includes the path quantity and the path quantity is a minimum quantity of the receive-signal paths of the user equipment from each of which a respective one of the plurality of positioning reference signals of a corresponding positioning frequency layer will be processed. For example, the indicated quantity of the receive-signal paths 560 may be the least number of receive-signal paths that will be assigned to a corresponding PFL. The corresponding PFL may be explicitly indicated (e.g., by a specific PFL (e.g., determined from PRS configuration information)) or implicitly indicated (e.g., by indicating a frequency band, or band combination, or band in band combination with an implicit indication all PFLs within the corresponding frequencies). In another further example implementation, the capability indication includes the path quantity and the path quantity is a total quantity of receive-signal paths of the user equipment capable of conveying the plurality of positioning reference signals. For example, the capability indication may indicate the total number of the receive-signal paths 560 that may be used for (e.g., tuned to appropriate frequencies for) conveying the PRS. The number of the receive-signal paths 560 actually used may be determined from an appropriate protocol, e.g., a statically-configured formula such as floor(K/N). In another further example implementation, the capability indication includes the path quantity, and the method 1500 further comprises receiving the plurality of positioning reference signals with a number of antennas indicated by the path quantity. The processor 510, possibly in combination with the memory 530, in combination with the interface (e.g., the wireless receiver 244 and the antenna 246 and the receive-signal paths 560) may comprise means for receiving the plurality of positioning reference signals with the number of antennas indicated by the path quantity. In another further example implementation, the capability indication includes the accuracy capability and the accuracy capability is a minimum accuracy capability of the user equipment for a corresponding positioning frequency layer. As discussed above, the corresponding PFL may be explicitly or implicitly indicated. In another example implementation, the capability indication includes the path quantity (e.g., and not explicitly include the accuracy capability), with the path quantity providing an implicit indication of the accuracy capability. The accuracy capability may be a function of, and thus determinable from, the number of receive-signal paths (e.g., number of antennas) used to receive the plurality of positioning reference signals, e.g., each of the plurality of positioning reference signals.

Also or alternatively, implementations of the method 1500 may include one or more of the following features. In an example implementation, each of the plurality of positioning reference signals is received with at least a default quantity of a plurality of receive-signal paths. For example, the processor 510 may cause (e.g., by adjusting one or more of the tuners 611, 621, one or more of the phase shifters 612, 622, and/or one or more of the filters 613, 614, 623, 624) to receive each of the plurality of positioning reference signals with at least a default quantity of a plurality of receive-signal paths. The default quantity may be set according to a standards specification and may be, for example, a single receive-signal path, or sufficient receive-signal paths to provide one or more corresponding accuracy requirements. In another example implementation, the capability indication includes a plurality of frequency band indications, and receiving the plurality of positioning reference signals comprises receiving each of a plurality of sets of the plurality of positioning reference signals from one or more shared receive-signal paths of a plurality of receive-signal paths, each of the plurality of sets of the plurality of positioning reference signals comprising positioning reference signals having frequencies in a respective frequency band indicated by the plurality of frequency band indications. For example, the UE 500 may be statically configured (e.g., in accordance with a standards specification) to have PFLs within the same frequency band (or frequency range) share receive-signal paths (e.g., share antennas), e.g., such that each of the PFLs within the same frequency band is received by the same one or more receive-signal paths.

Also or alternatively, implementations of the method 1500 may include one or more of the following features. In an example implementation, the capability indication comprises a sharing indication indicating a plurality of frequency bands, and receiving the plurality of positioning reference signals comprises, for each of the plurality of frequency bands, receiving respective ones of the plurality of positioning reference signals using one or more shared paths of a plurality of receive-signal paths. For example, the UE 500 may report which frequency bands will share receive-signal paths, e.g., with the report being per band set (e.g., pair) in a band combination. For each group of bands that share receive-signal paths (e.g., antennas), the UE 500 may be statically or dynamically configured such that all the PFLs within these bands would be received by all of the receive-signal paths, a single receive-signal path, or floor(K/N) receive-signal paths. The UE 500 may be configured to select which quantity of the receive-signal paths to use, e.g., based on one or more accuracy requirements to be met, or based on capabilities and/or availabilities of the receive-signal paths, and/or based on one or more other criteria. The processor 510 may indicate, e.g., in the sharing indication, what quantity of receive-signal paths the UE 500 will use to receive the plurality of frequency bands. In a further example implementation, the respective ones of the plurality of positioning reference signals are received from a selected one of: (1) a single one of the one or more shared paths; or (2) each of a first antenna quantity N of the one or more shared paths, the first antenna quantity N being a total number of the one or more shared paths capable of receiving the respective ones of the plurality of positioning reference signals of the plurality of frequency bands; or (3) each of a second antenna quantity M of the one or more shared paths, the second antenna quantity being equal to floor(K/N) where K is a quantity of the plurality of frequency bands. For example, the processor 510 can select one or more of the receive-signal paths 560 to receive respective ones of the PRS 1432. The processor 510, possibly in combination with the memory 530, in combination with the interface (e.g., the wireless receiver 244 and the antenna 246 and the receive-signal paths 560) may comprise means for receiving respective ones of the plurality of positioning reference signals. In a further example implementation, the sharing indication indicates whether the respective ones of the plurality of positioning signals will be received from (1), (2), or (3). For example, the capabilities message 1422 may indicate a protocol followed by the UE 500 for receiving the PRS 1432.

Implementation Examples

Implementation examples are provided in the following numbered clauses.

Clause 1. A user equipment comprising:

an interface comprising a plurality of receive-signal paths;

a memory; and a processor, communicatively coupled to the interface and the memory, configured to:

transmit, via the interface to a network entity, a capability indication indicating that the user equipment is capable of processing a plurality of positioning reference signals, of a plurality of different frequencies corresponding to different frequency layers, that at least partially overlap in receipt time at the user equipment; and measure the plurality of positioning reference signals that are received by the interface at least partially overlapping in time.

Clause 2. The user equipment of clause 1, wherein the capability indication includes at least one of a path quantity or an accuracy capability, the path quantity being a number of the plurality of receive-signal paths that the user equipment will use to receive the plurality of positioning reference signals.

Clause 3. The user equipment of clause 2, wherein the capability indication includes a respective frequency band indication corresponding to each of the at least one of the path quantity or the accuracy capability.

Clause 4. The user equipment of clause 2, wherein the capability indication includes a respective frequency band combination indication corresponding to each of the at least one of the path quantity or the accuracy capability.

Clause 5. The user equipment of clause 4, wherein the capability indication consists of a single bit for each respective frequency band combination indicating whether the user equipment is capable of processing respective ones of the plurality of positioning reference signals.

Clause 6. The user equipment of clause 5, wherein for each respective frequency band combination that the capability indication indicates that the user equipment is capable of processing the respective ones of the plurality of positioning reference signals, the user equipment is configured to receive each of the respective ones of the plurality of positioning reference signals with a single one of the plurality of receive-signal paths absent the capability indication including a value of the path quantity that is greater than one.

Clause 7. The user equipment of clause 2, wherein the capability indication includes a respective band/band-combination indication corresponding to each of the at least one of the path quantity or the accuracy capability, each band/band-combination indication indicating a frequency band of a frequency band combination.

Clause 8. The user equipment of clause 2, wherein the capability indication includes the path quantity and the path quantity is a minimum quantity of the plurality of receive-signal paths of the interface from each of which the processor will process a respective one of the plurality of positioning reference signals of a corresponding positioning frequency layer.

Clause 9. The user equipment of clause 2, wherein the capability indication includes the path quantity and the path quantity is a total quantity of the plurality of receive-signal paths of the interface capable of conveying the plurality of positioning reference signals.

Clause 10. The user equipment of clause 2, wherein the capability indication includes the path quantity and the path quantity indicates a number of antennas that the user equipment will use to receive the plurality of positioning reference signals.

Clause 11. The user equipment of clause 2, wherein the capability indication includes the accuracy capability and the accuracy capability is a minimum accuracy capability of the user equipment for a corresponding positioning frequency layer.

Clause 12. The user equipment of clause 2, wherein the capability indication includes the path quantity, the path quantity providing an implicit indication of the accuracy capability.

Clause 13. The user equipment of clause 1, wherein the processor is configured to receive each of the plurality of positioning reference signals with at least a default quantity of the plurality of receive-signal paths.

Clause 14. The user equipment of clause 1, wherein the capability indication includes a plurality of frequency band indications, and wherein the processor is configured to receive each of a plurality of sets of the plurality of positioning reference signals from one or more shared receive-signal paths of the plurality of receive-signal paths, each of the plurality of sets of the plurality of positioning reference signals comprising positioning reference signals having frequencies in a respective frequency band indicated by the plurality of frequency band indications.

Clause 15. The user equipment of clause 1, wherein the capability indication comprises a sharing indication indicating a plurality of frequency bands whose respective ones of the plurality of positioning reference signals will each be received by one or more shared paths of the plurality of receive-signal paths.

Clause 16. The user equipment of clause 15, wherein the processor is configured to process the respective ones of the plurality of positioning reference signals of the plurality of frequency bands from a selected one of:

(1) a single one of the one or more shared paths; or (2) each of a first antenna quantity N of the one or more shared paths, the first antenna quantity N being a total number of the one or more shared paths capable of receiving the respective ones of the plurality of positioning reference signals of the plurality of frequency bands; or (3) each of a second antenna quantity M of the one or more shared paths, the second antenna quantity being equal to floor(K/N) where K is a quantity of the plurality of frequency bands.

Clause 17. The user equipment of clause 16, wherein the sharing indication indicates whether the processor will process the respective ones of the plurality of positioning reference signals of the plurality of frequency bands according to (1), (2), or (3).

Clause 18. A user equipment comprising:

means for transmitting, a network entity, a capability indication indicating that the user equipment is capable of processing a plurality of positioning reference signals, of a plurality of different frequencies corresponding to different frequency layers, that at least partially overlap in receipt time at the user equipment; and means for processing the plurality of positioning reference signals that are received by the user equipment at least partially overlapping in time.

Clause 19. The user equipment of clause 18, wherein the capability indication includes at least one of a path quantity or an accuracy capability, the path quantity being a number of receive-signal paths, of receiving means of the means for processing, for receiving the plurality of positioning reference signals.

Clause 20. The user equipment of clause 19, wherein the capability indication includes a respective frequency band indication corresponding to each of the at least one of the path quantity or the accuracy capability.

Clause 21. The user equipment of clause 19, wherein the capability indication includes a respective frequency band combination indication corresponding to each of the at least one of the path quantity or the accuracy capability.

Clause 22. The user equipment of clause 21, wherein the capability indication consists of a single bit for each respective frequency band combination indicating whether the user equipment is capable of processing respective ones of the plurality of positioning reference signals.

Clause 23. The user equipment of clause 22, wherein for each respective frequency band combination that the capability indication indicates that the user equipment is capable of processing the respective ones of the plurality of positioning reference signals, the receiving means are for receiving each of the respective ones of the plurality of positioning reference signals with a single one of the plurality of receive-signal paths absent the capability indication including a value of the path quantity that is greater than one.

Clause 24. The user equipment of clause 19, wherein the capability indication includes a respective band/band-combination indication corresponding to each of the at least one of the path quantity or the accuracy capability, each band/band-combination indication indicating a frequency band of a frequency band combination.

Clause 25. The user equipment of clause 19, wherein the capability indication includes the path quantity and the path quantity is a minimum quantity of the receive-signal paths of the means for processing from each of which the means for processing will process a respective one of the plurality of positioning reference signals of a corresponding positioning frequency layer.

Clause 26. The user equipment of clause 19, wherein the capability indication includes the path quantity and the path quantity is a total quantity of the receive-signal paths of the means for processing that are capable of conveying the plurality of positioning reference signals.

Clause 27. The user equipment of clause 19, wherein the capability indication includes the path quantity and the path quantity indicates a number of antennas that the receiving means will use to receive the plurality of positioning reference signals.

Clause 28. The user equipment of clause 19, wherein the capability indication includes the accuracy capability and the accuracy capability is a minimum accuracy capability of the user equipment for a corresponding positioning frequency layer.

Clause 29. The user equipment of clause 18, wherein the capability indication includes a plurality of frequency band indications, and wherein the means for processing include receiving means for receiving each of a plurality of sets of the plurality of positioning reference signals from one or more shared receive-signal paths of a plurality of receive-signal paths, each of the plurality of sets of the plurality of positioning reference signals comprising positioning reference signals having frequencies in a respective frequency band indicated by the plurality of frequency band indications.

Clause 30. The user equipment of clause 18, wherein the means for processing comprise receiving means including a plurality of receive-signal paths, and wherein the capability indication comprises a sharing indication indicating a plurality of frequency bands whose respective ones of the plurality of positioning reference signals will each be received by one or more shared paths of the plurality of receive-signal paths.

Clause 31. The user equipment of clause 30, wherein the means for processing are for processing the respective ones of the plurality of positioning reference signals of the plurality of frequency bands from a selected one of:

(1) a single one of the one or more shared paths; or (2) each of a first antenna quantity N of the one or more shared paths, the first antenna quantity N being a total number of the one or more shared paths capable of receiving the respective ones of the plurality of positioning reference signals of the plurality of frequency bands; or (3) each of a second antenna quantity M of the one or more shared paths, the second antenna quantity being equal to floor(K/N) where K is a quantity of the plurality of frequency bands.

Clause 32. A signal processing method comprising:

transmitting, to a network entity from a user equipment, a capability indication indicating that the user equipment is capable of processing a plurality of positioning reference signals, of a plurality of different frequencies corresponding to different frequency layers, that at least partially overlap in receipt time at the user equipment;

receiving the plurality of positioning reference signals at the user equipment at least partially overlapping in time; and processing the plurality of positioning reference signals at the user equipment in accordance with the capability indication.

Clause 33. The signal processing method of clause 32, wherein the capability indication includes at least one of a path quantity or an accuracy capability, the path quantity being a number of receive-signal paths that the user equipment will use to receive the plurality of positioning reference signals.

Clause 34. The signal processing method of clause 33, wherein the capability indication includes a respective frequency band indication corresponding to each of the at least one of the path quantity or the accuracy capability.

Clause 35. The signal processing method of clause 33, wherein the capability indication includes a respective frequency band combination indication corresponding to each of the at least one of the path quantity or the accuracy capability.

Clause 36. The signal processing method of clause 35, wherein the capability indication consists of a single bit for each respective frequency band combination indicating whether the user equipment is capable of processing respective ones of the plurality of positioning reference signals.

Clause 37. The signal processing method of clause 36, wherein for each respective frequency band combination that the capability indication indicates that the user equipment is capable of processing the respective ones of the plurality of positioning reference signals, the signal processing method comprises receiving each of the respective ones of the plurality of positioning reference signals with a single one of the plurality of receive-signal paths absent the capability indication including a value of the path quantity that is greater than one.

Clause 38. The signal processing method of clause 33, wherein the capability indication includes a respective band/band-combination indication corresponding to each of the at least one of the path quantity or the accuracy capability, each band/band-combination indication indicating a frequency band of a frequency band combination.

Clause 39. The signal processing method of clause 33, wherein the capability indication includes the path quantity and the path quantity is a minimum quantity of the receive-signal paths of the user equipment from each of which a respective one of the plurality of positioning reference signals of a corresponding positioning frequency layer will be processed.

Clause 40. The signal processing method of clause 33, wherein the capability indication includes the path quantity and the path quantity is a total quantity of receive-signal paths of the user equipment capable of conveying the plurality of positioning reference signals.

Clause 41. The signal processing method of clause 33, wherein the capability indication includes the path quantity, the signal processing method further comprising receiving the plurality of positioning reference signals with a number of antennas indicated by the path quantity.

Clause 42. The signal processing method of clause 33, wherein the capability indication includes the accuracy capability and the accuracy capability is a minimum accuracy capability of the user equipment for a corresponding positioning frequency layer.

Clause 43. The signal processing method of clause 33, wherein the capability indication includes the path quantity, the path quantity providing an implicit indication of the accuracy capability.

Clause 44. The signal processing method of clause 32, wherein the capability indication includes a plurality of frequency band indications, and wherein receiving the plurality of positioning reference signals comprises receiving each of a plurality of sets of the plurality of positioning reference signals from one or more shared receive-signal paths of a plurality of receive-signal paths, each of the plurality of sets of the plurality of positioning reference signals comprising positioning reference signals having frequencies in a respective frequency band indicated by the plurality of frequency band indications.

Clause 45. The signal processing method of clause 32, wherein the capability indication comprises a sharing indication indicating a plurality of frequency bands, and wherein receiving the plurality of positioning reference signals comprises, for each of the plurality of frequency bands, receiving respective ones of the plurality of positioning reference signals using one or more shared paths of a plurality of receive-signal paths.

Clause 46. The signal processing method of clause 45, wherein the respective ones of the plurality of positioning reference signals are received from a selected one of:

(1) a single one of the one or more shared paths; or (2) each of a first antenna quantity N of the one or more shared paths, the first antenna quantity N being a total number of the one or more shared paths capable of receiving the respective ones of the plurality of positioning reference signals of the plurality of frequency bands; or (3) each of a second antenna quantity M of the one or more shared paths, the second antenna quantity being equal to floor(K/N) where K is a quantity of the plurality of frequency bands.

Clause 47. The signal processing method of clause 46, wherein the sharing indication indicates whether the respective ones of the plurality of positioning reference signals will be received from (1), (2), or (3).

Clause 48. A non-transitory, processor-readable storage medium comprising processor-readable instructions configured to cause a processor of a user equipment, in order to process signals at the user equipment, to:

transmit, to a network entity from the user equipment, a capability indication indicating that the user equipment is capable of processing a plurality of positioning reference signals, of a plurality of different frequencies corresponding to different frequency layers, that at least partially overlap in time at the user equipment; and process the plurality of positioning reference signals in accordance with the capability indication.

Clause 49. The storage medium of clause 48, wherein the capability indication includes at least one of a path quantity or an accuracy capability, the path quantity being a number of receive-signal paths that the user equipment will use to receive the plurality of positioning reference signals.

Clause 50. The storage medium of clause 49, wherein the capability indication includes a respective frequency band indication corresponding to each of the at least one of the path quantity or the accuracy capability.

Clause 51. The storage medium of clause 49, wherein the capability indication includes a respective frequency band combination indication corresponding to each of the at least one of the path quantity or the accuracy capability.

Clause 52. The storage medium of clause 51, wherein the capability indication consists of a single bit for each respective frequency band combination indicating whether the user equipment is capable of processing respective ones of the plurality of positioning reference signals with the respective ones of the plurality of positioning reference signals being received by the user equipment at least partially overlapping in time.

Clause 53. The storage medium of clause 52, wherein the processor-readable instructions comprise processor-readable instructions configured to cause the processor to cause the user equipment, for each respective frequency band combination that the capability indication indicates that the user equipment is capable of processing the respective ones of the plurality of positioning reference signals, to receive each of the respective ones of the plurality of positioning reference signals with a single one of the plurality of receive-signal paths absent the capability indication including a value of the path quantity that is greater than one.

Clause 54. The storage medium of clause 49, wherein the capability indication includes a respective band/band-combination indication corresponding to each of the at least one of the path quantity or the accuracy capability, each band/band-combination indication indicating a frequency band of a frequency band combination.

Clause 55. The storage medium of clause 49, wherein the capability indication includes the path quantity and the path quantity is a minimum quantity of the receive-signal paths of the user equipment from each of which the processor-readable instructions are configured to cause the processor to process a respective one of the plurality of positioning reference signals of a corresponding positioning frequency layer.

Clause 56. The storage medium of clause 49, wherein the capability indication includes the path quantity and the path quantity is a total quantity of receive-signal paths of the user equipment capable of conveying the plurality of positioning reference signals to the processor.

Clause 57. The storage medium of clause 49, wherein the capability indication includes the path quantity, and wherein the processor-readable instructions comprise processor-readable instructions configured to cause the processor to cause the user equipment to receive the plurality of positioning reference signals with a number of antennas indicated by the path quantity.

Clause 58. The storage medium of clause 49, wherein the capability indication includes the accuracy capability and the accuracy capability is a minimum accuracy capability of the user equipment for a corresponding positioning frequency layer.

Clause 59. The storage medium of clause 49, wherein the capability indication includes the path quantity, the path quantity providing an implicit indication of the accuracy capability.

Clause 60. The storage medium of clause 48, wherein the capability indication includes a plurality of frequency band indications, and wherein the processor-readable instructions comprise processor-readable instructions configured to cause the processor to cause the user equipment to receive each of a plurality of sets of the plurality of positioning reference signals from one or more shared receive-signal paths of a plurality of receive-signal paths, each of the plurality of sets of the plurality of positioning reference signals comprising positioning reference signals having frequencies in a respective frequency band indicated by the plurality of frequency band indications.

Clause 61. The storage medium of clause 48, wherein the capability indication comprises a sharing indication indicating a plurality of frequency bands, and wherein the processor-readable instructions comprise processor-readable instructions configured to cause the processor to cause the user equipment to receive, for each of the plurality of frequency bands, respective ones of the plurality of positioning reference signals using one or more shared paths of a plurality of receive-signal paths.

Clause 62. The storage medium of clause 61, wherein the instructions configured to cause the processor to cause the user equipment to receive the respective ones of the plurality of positioning reference signals are configured to cause the user equipment to receive the respective ones of the plurality of positioning reference signals from a selected one of:

(1) a single one of the one or more shared paths; or (2) each of a first antenna quantity N of the one or more shared paths, the first antenna quantity N being a total number of the one or more shared paths capable of receiving the respective ones of the plurality of frequency bands; or (3) each of a second antenna quantity M of the one or more shared paths, the second antenna quantity being equal to floor(K/N) where K is a quantity of the plurality of frequency bands.

Clause 63. The storage medium of clause 62, wherein the sharing indication indicates whether the processor will process the respective ones of the plurality of positioning reference signals of the plurality of frequency bands according to (1), (2), or (3).

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms “a,” “an,” and “the” include the plural forms as well, unless the context clearly indicates otherwise. The terms “comprises,” “comprising,” “includes,” and/or “including,” as used herein, specify the presence of stated features, integers, steps, operations, elements, and/or components, but do not preclude the presence or addition of one or more other features, integers, steps, operations, elements, components, and/or groups thereof.

Also, as used herein, “or” as used in a list of items (possibly prefaced by “at least one of” or prefaced by “one or more of”) indicates a disjunctive list such that, for example, a list of “at least one of A, B, or C,” or a list of “one or more of A, B, or C” or a list of “A or B or C” means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of “a processor configured to measure at least one of A or B” or “a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment comprising:

an interface comprising a plurality of receive-signal paths;

a memory; and a processor, communicatively coupled to the interface and the memory, configured to:

transmit, via the interface to a network entity, a capability indication indicating that the user equipment is capable of processing a plurality of positioning reference signals, of a plurality of different frequencies corresponding to different frequency layers, that at least partially overlap in receipt time at the user equipment; and measure the plurality of positioning reference signals that are received by the interface at least partially overlapping in time;

wherein the capability indication includes at least one of a path quantity or an accuracy capability, the path quantity being a number of the plurality of receive-signal paths with which the user equipment is configured to receive the plurality of positioning reference signals, and the capability indication includes a respective frequency band indication corresponding to each of the at least one of the path quantity or the accuracy capability.

2. The user equipment of claim 1, wherein the capability indication includes a respective frequency band combination indication corresponding to each of the at least one of the path quantity or the accuracy capability.

3. The user equipment of claim 2, wherein the capability indication consists of a single bit for each respective frequency band combination indicating whether the user equipment is capable of processing respective ones of the plurality of positioning reference signals.

4. The user equipment of claim 3, wherein for each respective frequency band combination that the capability indication indicates that the user equipment is capable of processing the respective ones of the plurality of positioning reference signals, the user equipment is configured to receive each of the respective ones of the plurality of positioning reference signals with a single one of the plurality of receive-signal paths absent the capability indication including a value of the path quantity that is greater than one.

5. The user equipment of claim 1, wherein the capability indication includes a respective band/band-combination indication corresponding to each of the at least one of the path quantity or the accuracy capability, each band/band-combination indication indicating a frequency band of a frequency band combination.

6. A signal processing method comprising:

transmitting, to a network entity from a user equipment, a capability indication indicating that the user equipment is capable of processing a plurality of positioning reference signals, of a plurality of different frequencies corresponding to different frequency layers, that at least partially overlap in receipt time at the user equipment;

receiving the plurality of positioning reference signals at the user equipment at least partially overlapping in time; and processing the plurality of positioning reference signals at the user equipment in accordance with the capability indication;

wherein the capability indication includes at least one of a path quantity or an accuracy capability, the path quantity being a number of receive-signal paths with which the user equipment is configured to receive the plurality of positioning reference signals, and the capability indication includes a respective frequency band indication corresponding to each of the at least one of the path quantity or the accuracy capability.

7. The signal processing method of claim 6, wherein the capability indication includes a respective frequency band combination indication corresponding to each of the at least one of the path quantity or the accuracy capability.

8. The signal processing method of claim 6, wherein the capability indication includes a respective band/band-combination indication corresponding to each of the at least one of the path quantity or the accuracy capability, each band/band-combination indication indicating a frequency band of a frequency band combination.

9. The signal processing method of claim 6, wherein the capability indication includes the path quantity and the path quantity is a minimum quantity of the receive-signal paths of the user equipment from each of which a respective one of the plurality of positioning reference signals of a corresponding positioning frequency layer will be processed.

10. The signal processing method of claim 6, wherein the capability indication includes the path quantity and the path quantity is a total quantity of receive-signal paths of the user equipment capable of conveying the plurality of positioning reference signals.

11. A network entity comprising:

an transceiver;

a memory; and a processor, communicatively coupled to the transceiver and the memory, configured to:

receive, via the transceiver from a user equipment, a capability indication indicating that the user equipment is capable of processing a plurality of positioning reference signals, of a plurality of different frequencies corresponding to different frequency layers, that at least partially overlap in receipt time at the user equipment; and transmit, via the transceiver, the plurality of positioning reference signals at least partially overlapping in time;

wherein the capability indication includes at least one of a path quantity or an accuracy capability, the path quantity being a number of a plurality of receive-signal paths with which the user equipment is configured to receive the plurality of positioning reference signals, and the capability indication includes a respective frequency band indication corresponding to each of the at least one of the path quantity or the accuracy capability.

12. The network entity of claim 11, wherein the capability indication includes a respective frequency band combination indication corresponding to each of the at least one of the path quantity or the accuracy capability, and wherein the processor is configured to transmit the plurality of positioning reference signals in accordance with the respective frequency band combination.

13. The network entity of claim 12, wherein the capability indication consists of a single bit for each respective frequency band combination indicating whether the user equipment is capable of processing respective ones of the plurality of positioning reference signals.

14. The network entity of claim 11, wherein the capability indication includes a respective band/band-combination indication corresponding to each of the at least one of the path quantity or the accuracy capability, each band/band-combination indication indicating a frequency band of a frequency band combination, and wherein the processor is configured to transmit the plurality of positioning reference signals in accordance with the respective band/band-combination indication.

15. The network entity of claim 11, wherein the capability indication includes a plurality of frequency band indications, and wherein the processor is configured to transmit the plurality of positioning reference signals in accordance with the plurality of frequency band indications.

16. The network entity of claim 11, wherein the capability indication includes a plurality of frequency band indications, and wherein transmitting the plurality of positioning reference signals comprises transmitting the plurality of positioning reference signals in accordance with the plurality of frequency band indications.

17. A signal processing method comprising:

receive, at a network entity from a user equipment, a capability indication indicating that the user equipment is capable of processing a plurality of positioning reference signals, of a plurality of different frequencies corresponding to different frequency layers, that at least partially overlap in receipt time at the user equipment; and transmitting, from the network entity to the user equipment, the plurality of positioning reference signals at least partially overlapping in time;

wherein the capability indication includes at least one of a path quantity or an accuracy capability, the path quantity being a number of receive-signal paths with which the user equipment is configured to receive the plurality of positioning reference signals, and the capability indication includes a respective frequency band indication corresponding to each of the at least one of the path quantity or the accuracy capability.

18. The signal processing method of claim 17, wherein the capability indication includes a respective frequency band combination indication corresponding to each of the at least one of the path quantity or the accuracy capability, and wherein transmitting the plurality of positioning reference signals comprises transmitting the plurality of positioning reference signals in accordance with the respective frequency band combination.

19. The signal processing method of claim 17, wherein the capability indication includes the path quantity and the path quantity is a total quantity of receive-signal paths of the user equipment capable of conveying the plurality of positioning reference signals.

20. The signal processing method of claim 17, wherein the capability indication includes a respective band/band-combination indication corresponding to each of the at least one of the path quantity or the accuracy capability, each band/band-combination indication indicating a frequency band of a frequency band combination, and wherein transmitting the plurality of positioning reference signals comprises transmitting the plurality of positioning reference signals in accordance with the respective band/band-combination indication.

* * * * *